(12) United States Patent
Bauer et al.

(10) Patent No.: US 8,796,973 B2
(45) Date of Patent: Aug. 5, 2014

(54) FILTER APPARATUS AND METHOD FOR BRUSHLESS DC MOTORS

(75) Inventors: Scott Eugene Bauer, Holly, MI (US); John Andrew Bleecker, III, Canton, MI (US)

(73) Assignee: Hella Corporate Center USA, Inc., Plymouth, MI (US)

( * ) Notice: Subject to any disclaimer, the term of this patent is extended or adjusted under 35 U.S.C. 154(b) by 193 days.

(21) Appl. No.: 13/430,188

(22) Filed: Mar. 26, 2012

(65) Prior Publication Data

US 2013/0249459 A1    Sep. 26, 2013

(51) Int. Cl.
*H02P 6/00* (2006.01)

(52) U.S. Cl.
USPC ............ 318/400.35; 318/400.34; 318/400.01; 318/400.06; 323/318; 703/18

(58) Field of Classification Search
USPC ......... 318/400.4, 400.35, 437, 257, 459, 799, 318/823, 685, 696; 128/903; 607/32, 60; 356/5.01, 5.07; 324/160, 161, 163, 324/166; 361/236, 237, 238, 240, 244
See application file for complete search history.

(56) References Cited

U.S. PATENT DOCUMENTS

| | | | |
|---|---|---|---|
| 4,162,435 A * | 7/1979 | Wright | 318/400.04 |
| 4,495,450 A | 1/1985 | Tokizaki et al. | |
| 4,595,865 A | 6/1986 | Jahns | |
| 5,278,481 A * | 1/1994 | Danbury | 318/685 |
| 5,644,203 A | 7/1997 | Naito et al. | |
| 5,789,895 A | 8/1998 | Lee | |
| 6,295,473 B1 * | 9/2001 | Rosar | 607/60 |
| 6,469,461 B1 | 10/2002 | Konda et al. | |
| 6,995,538 B2 | 2/2006 | Hayashi | |
| 7,089,678 B2 * | 8/2006 | Novak et al. | 33/706 |
| 7,122,980 B2 | 10/2006 | Kuroshima et al. | |
| 7,250,733 B2 | 7/2007 | De Filippis et al. | |
| 7,274,161 B2 | 9/2007 | Mori et al. | |
| 7,869,707 B2 * | 1/2011 | Hampel | 398/9 |
| 8,018,189 B2 | 9/2011 | Narumi et al. | |
| 8,030,867 B1 | 10/2011 | Allison, III | |
| 8,125,620 B2 * | 2/2012 | Lewis | 356/5.01 |
| 2007/0296478 A1 * | 12/2007 | Alfano et al. | 327/274 |
| 2008/0048746 A1 * | 2/2008 | Raman | 327/205 |
| 2009/0153086 A1 * | 6/2009 | Narumi et al. | 318/400.35 |
| 2010/0117703 A1 * | 5/2010 | Zhu et al. | 327/206 |
| 2011/0221371 A1 | 9/2011 | Paintz et al. | |
| 2013/0111189 A1 * | 5/2013 | Boehl et al. | 712/29 |

OTHER PUBLICATIONS

International Search Report for International Application No. PCT/US13/33825.

* cited by examiner

*Primary Examiner* — Shawki S Ismail
*Assistant Examiner* — Jorge L Carrasquillo
(74) *Attorney, Agent, or Firm* — Husch Blackwell LLP

(57) ABSTRACT

In a multi-phase brushless DC motor, a zero crossing N-bit filter includes a comparator and a phase multiplexer. The phase multiplexer connects each motor phase to each of a positive and a negative input of the comparator, with a switch in each connection to form a switch array. A microprocessor is disposed to operate the switches, and is configured to measure a BEMF for a first phase by opening the switches connecting all other phases to the positive input of the comparator and by opening the switch connecting the first phase being measured to the negative input of said comparator. The comparators output is received by a shift register. The microprocessor is configured to respond to a zero crossing when a majority of bits in the shift register change between high and low.

19 Claims, 19 Drawing Sheets

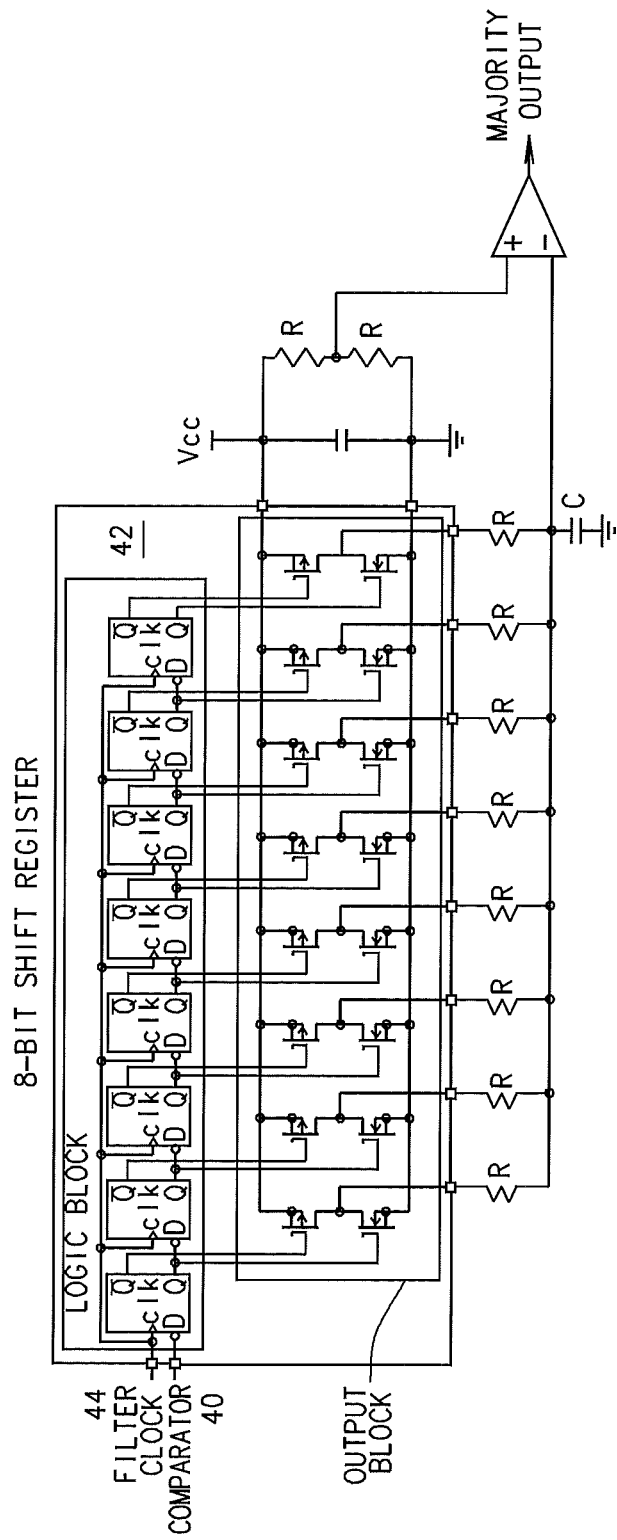
F I G . 1 4

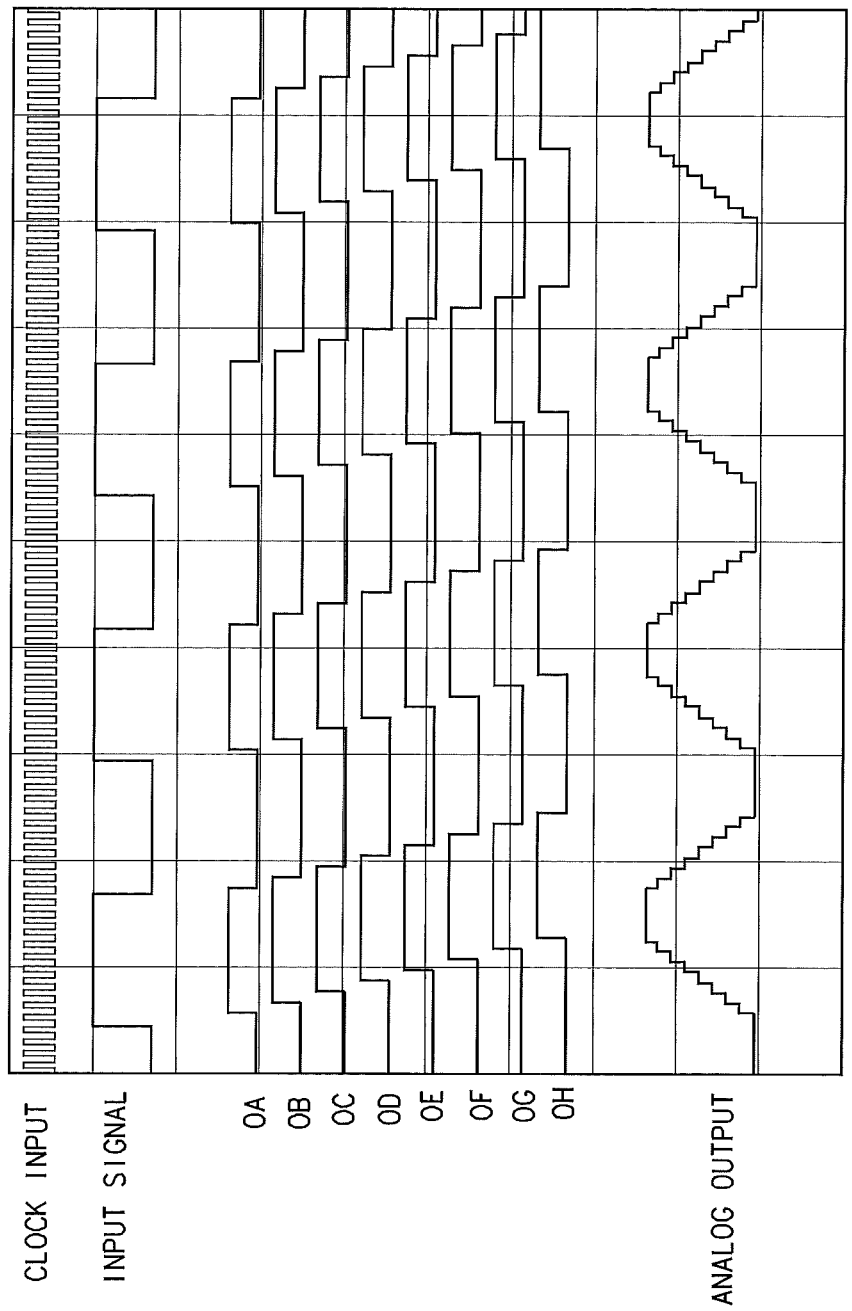
F I G. 15

FILTER APPARATUS AND METHOD FOR BRUSHLESS DC MOTORS

RELATED APPLICATIONS

None

BACKGROUND OF THE INVENTION

1. Field of the Invention

The present invention is in the field of Filtering Brushless DC Motors.

2. Related Art

The invention is in regards to the classical comparator method of zero cross detection in the commutation of brushless DC (BLDC) motors. The state of the art in zero cross detection involves using one or more analog comparators to compare the floating phase voltage to any one or all of three voltage levels, depending on the employed pulse width modulation (PWM) switching scheme. These levels are the driver bridge power supply voltage (VBATT), VBATT/2, or 0V. The comparator reference level chosen depends on the states of the active driver switches. The generic six switch bridge topology with one detection comparator per phase is shown in FIG. 1.

The motor windings develop Back-EMF (BEMF) voltages via Lenz's Law, the shape of which is a function of rotor speed and winding construction. Assuming perfect winding symmetry, the driven phase BEMFs are equal and of opposite polarity, hence they cancel. The floating phase BEMF is bipolar about an offset produced by the driven windings since they share a common Y connection. It is common knowledge that classical comparison methods are applicable to delta connected motors as well. Typically, BLOC motors have a wave shape containing both sinusoidal and trapezoidal characteristics. Regardless, the waveform will reverse polarity at approximately the same point in time. This polarity reversal occurs 30 degrees ahead of the motor commutation time. Synchronous rectification is usually employed to reduce losses in the body diodes of the MOSFETs. Switching may be done on the high or low side, with current recirculation through the opposite side. Accommodation of all switching combinations requires a switchable reference for the comparators as illustrated in FIG. 2.

The motor possesses inductance, and in conjunction with unavoidable capacitances in the system, ringing is introduced during the switch transitions. This ringing causes the floating phase voltage to cross the applicable reference many times per cycle, and unless removed, will be interpreted as false zero crossings. In general, the quantity of false zero crossings due to ringing are proportional to battery voltage, and inversely proportional to motor speed. In the ideal theoretical application, there is no ringing present, and there is only one zero crossing detected.

The source of the problem is illustrated in FIGS. 3 and 4.

It can be seen that at lower speeds, the slope of the ramp is reduced, and more false crossings will be induced. These false crossings are detrimental to proper commutation of the motor. The results are jitter in the speed, torque ripple, and stalling of the motor at higher speeds.

One typical method used to remove this ringing involves digitally filtering the noise zero cross signal through a flip flop clocked by the PWM signal, see for example FIG. 5.

This is effectively digitally filtering the comparator output at the PWM frequency. If the PWM frequency is relatively low, the worst case delay introduced by such a filter is one full PWM period. Consider a two pole pair motor running at 10000 RPM. This translates to a 500 microsecond enable window size. 100 microseconds of delay can easily cause the motor to stall. This causes considerable phase lag at lower PWM frequencies. Commutation failure can occur at higher motor speeds with this method. The flip flop can be clocked at multiples of the PWM frequency to allow comparisons on both high and low PWM states; however this requires the host microcontroller timebase to run at twice the PWM frequency, which may not be possible or practical.

Another method used is to filter the PWM frequency using analog filters. This method introduces a phase lag which will vary with tolerance and aging of the components, as well as be influenced by temperature. The filtering frequency must track with the PWM frequency, and this complicates the ideal filter design as well as compounds the error due to tolerances. One solution is to characterize the typical filtering delay at the PWM frequency and keep the PWM frequency fixed. Since a common method of thermal management in motor drives is to change PWM frequency as mitigation to switching losses, fixing the PWM frequency presents a serious disadvantage.

SUMMARY OF THE INVENTION

This invention presents a novel way to filter the comparator pulse train to extract the true zero crossing in the presence of ringing noise with predictable group delay. It makes use of a shift register as an integral component in the embodiment of an n-bit digital majority filter in the analog domain. Other embodiments yield a completely integrated solution using common microcontroller peripherals such as SPI ports or high speed UARTs. The majority function can then be executed in the digital domain using lookup tables. The full exhaustive formulation of embodiments shall be presented, beginning with the constructed and tested version which is considered the best implementation for integration into an ASIC. The tested embodiment is based on an analog multiplexer and 8-bit shift register implemented in discrete hardware.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

FIG. 14 is a schematic circuit diagram of the present invention.

FIG. 15 depicts signals as processed by the present invention.

DETAILED DESCRIPTION

Figure 1:
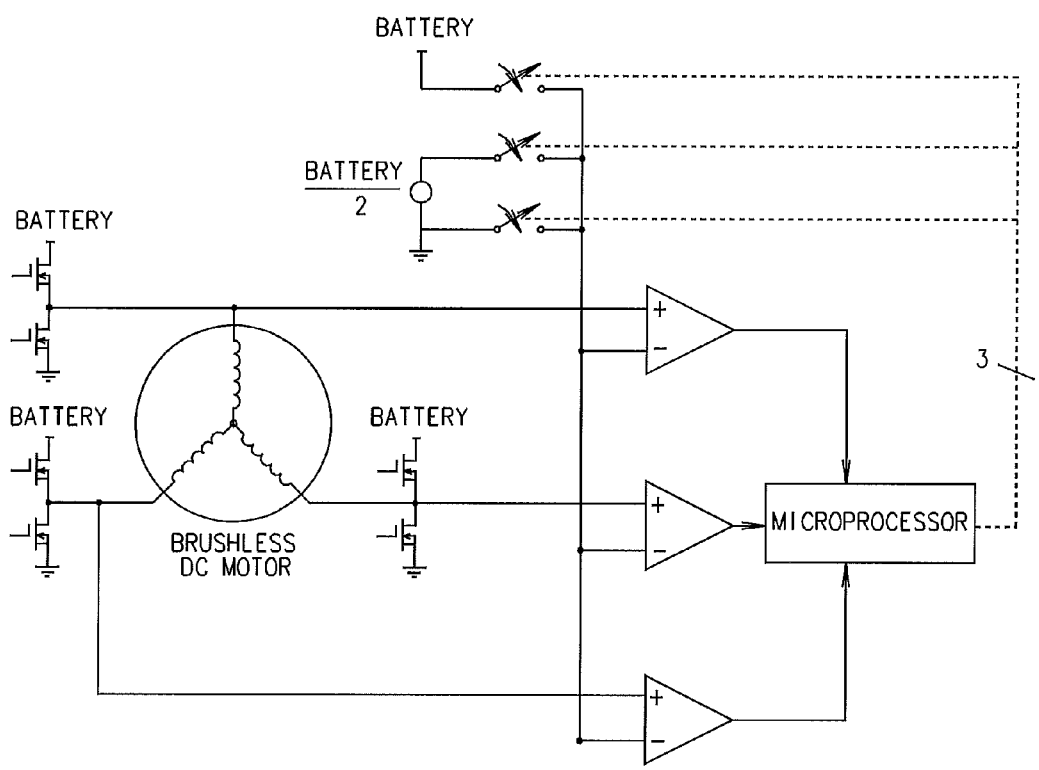
FIG. 1 is a schematic circuit diagram of prior art.
Figure 2:
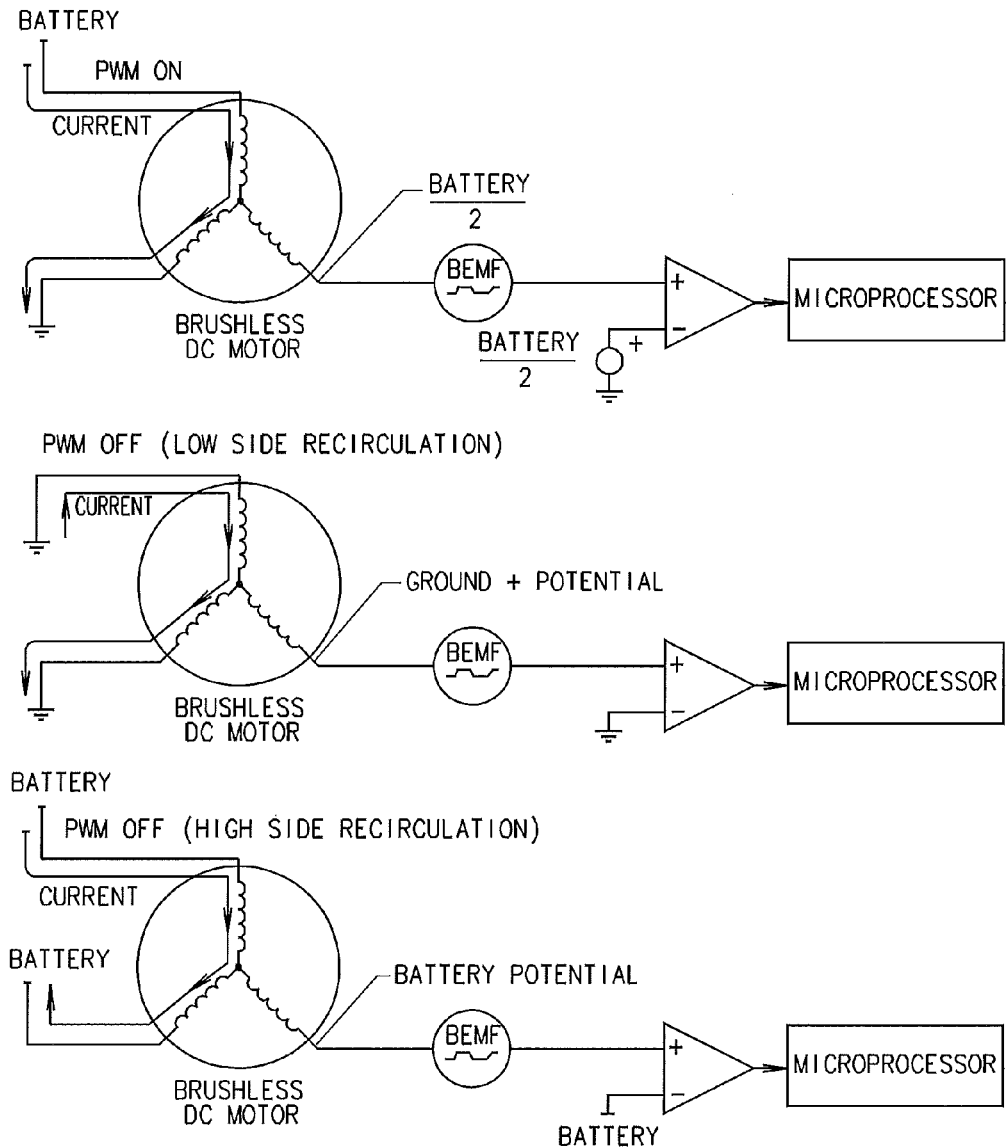
FIG. 2 is a schematic circuit diagram of prior art.
Figure 3:
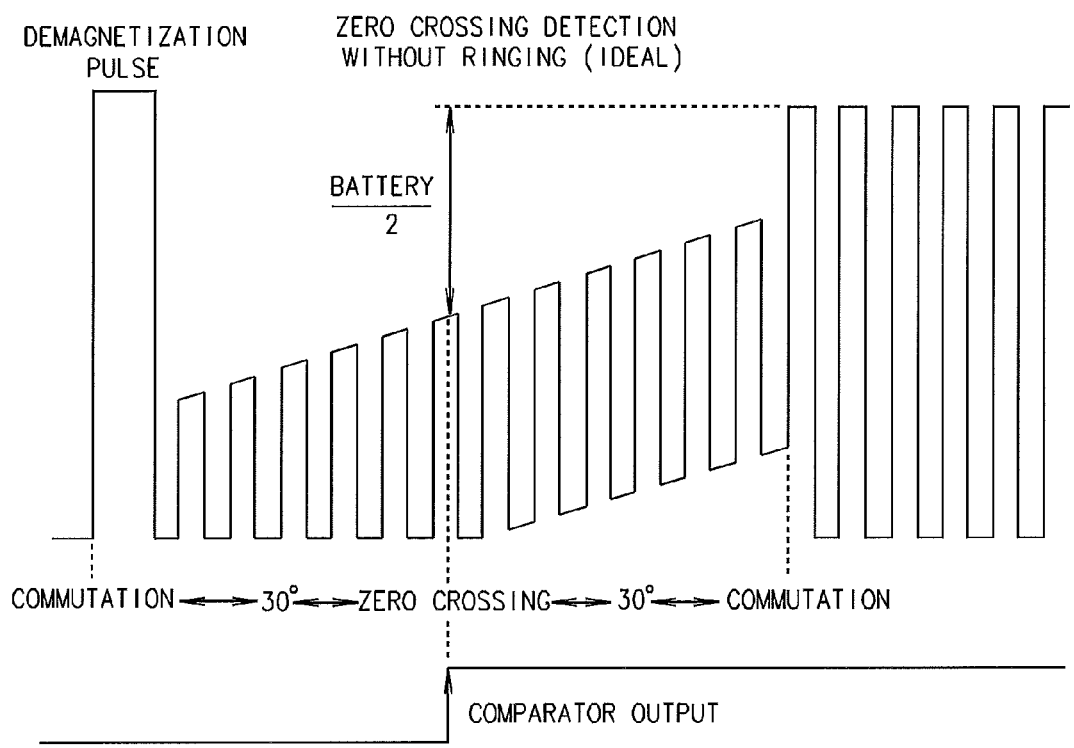
FIG. 3 depicts a zero crossing direction.
Figure 4:
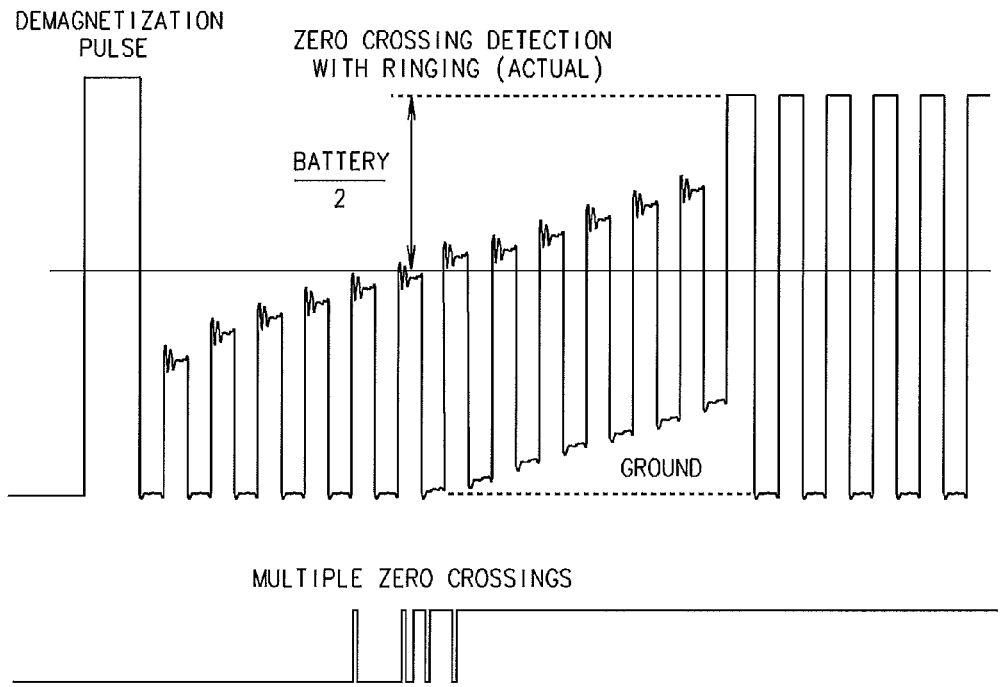
FIG. 4 depicts a zero crossing direction with ringing.
Figure 5:
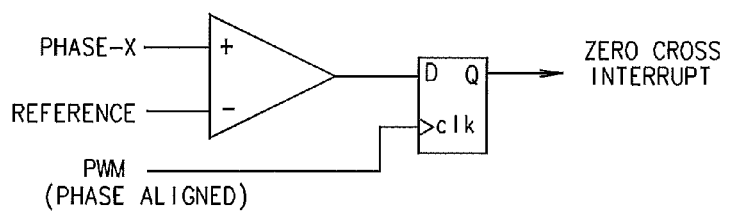
FIG. 5 is a schematic circuit diagram of prior art.
Figure 6:
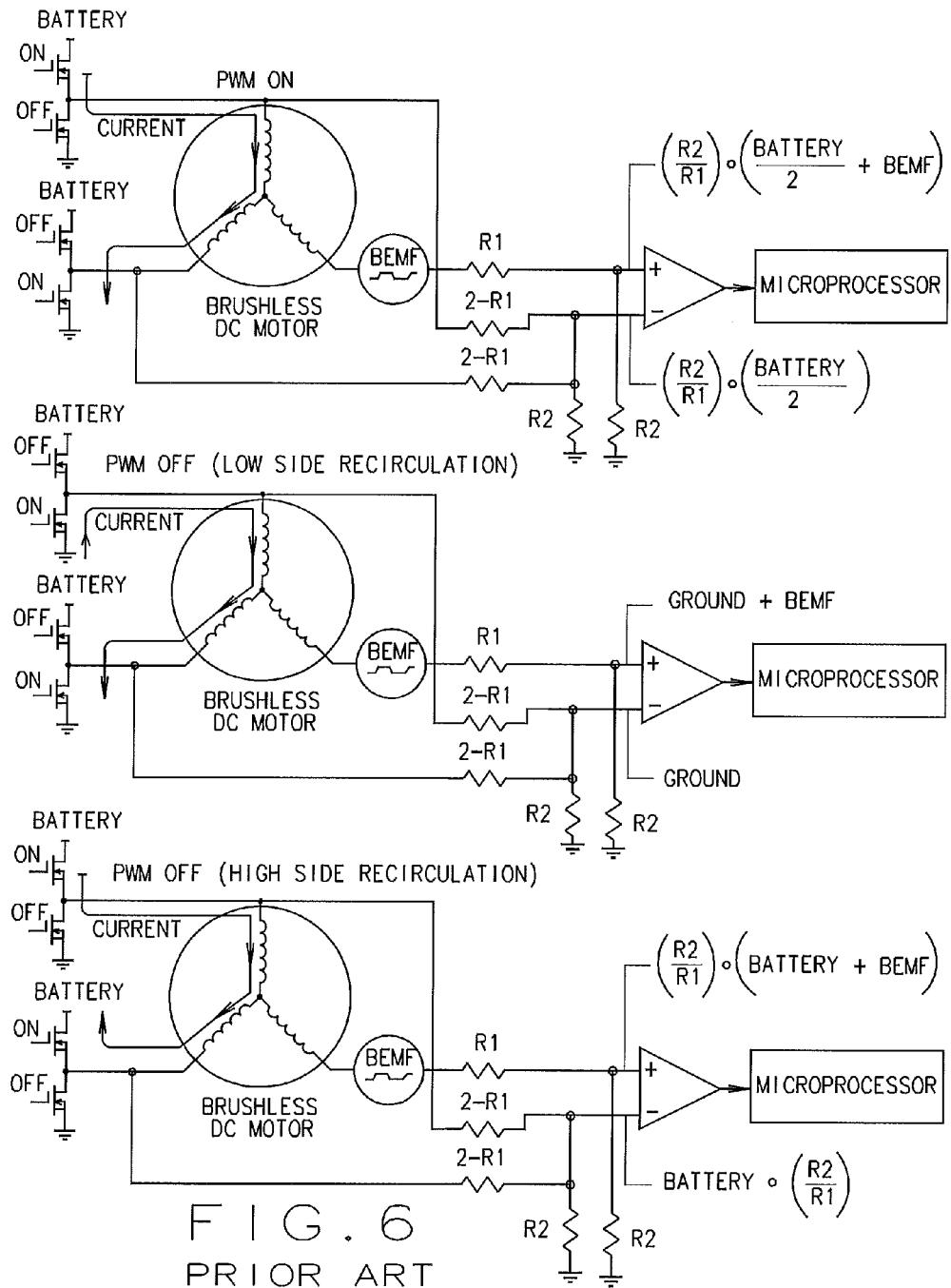
FIG. 6 is a schematic circuit diagram of prior art.

In the following description like reference numbers refer to like elements. Many microcontrollers contain internal comparators. The motor terminal voltages must be appropriately divided to accommodate the Microprocessor input range, typically (3.3-5)V. A common technique can be employed using resistor networks connected to the driven phases to automatically adjust the comparator reference for the floating phase. Recalling the previous three PWM state diagrams, the resistor network application for external comparators is shown in FIG. 6 below (Prior Art). One can see that the three resistor network on the negative input has the same division ratio as the positive input.

An active switching matrix is used herein as a phase multiplexer for the zero crossing filter. In one embodiment of the present invention, all three phases are connected to one comparator via resistor networks with six switches under microprocessor control. This arrangement shall be referred to as the phase multiplexer. The circuit works by summing all three phase voltages through equal resistors. Two such networks are employed, one for each comparator input. Each individual resistor is a series string of two resistors for a total of 12 resistors as shown in FIG. 7.

Figure 7:
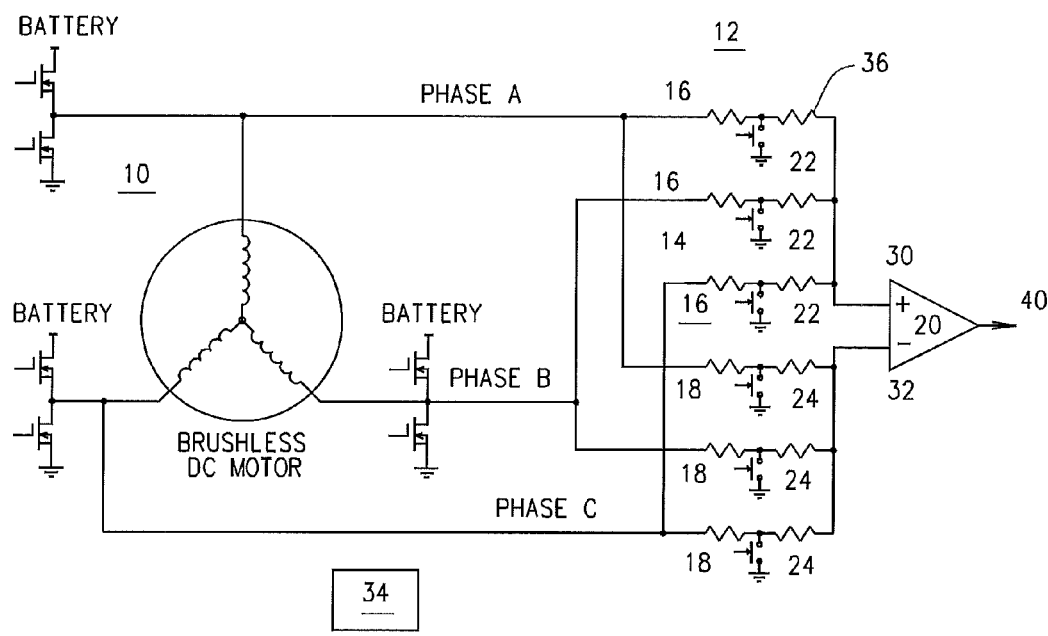
FIG. 7 is a schematic circuit diagram of the present invention.

As seen in FIG. 7, filter 12 includes switch array 14 and is disposed to filter motor 10, which may be a BLDC motor. For each motor phase, there is a connection 16 with the positive input 30, comparator 20, and is a connection 1 with the negative input 32 of comparator 20. Each positive phase connection is mediated by a switch 22, as is each negative phase connection, by switches 24. The switches may be controlled by microprocessor 34, whose operative connection with the switches is omitted for clarity. The circuit may advantageously deploy resistors 36.

Figure 8:
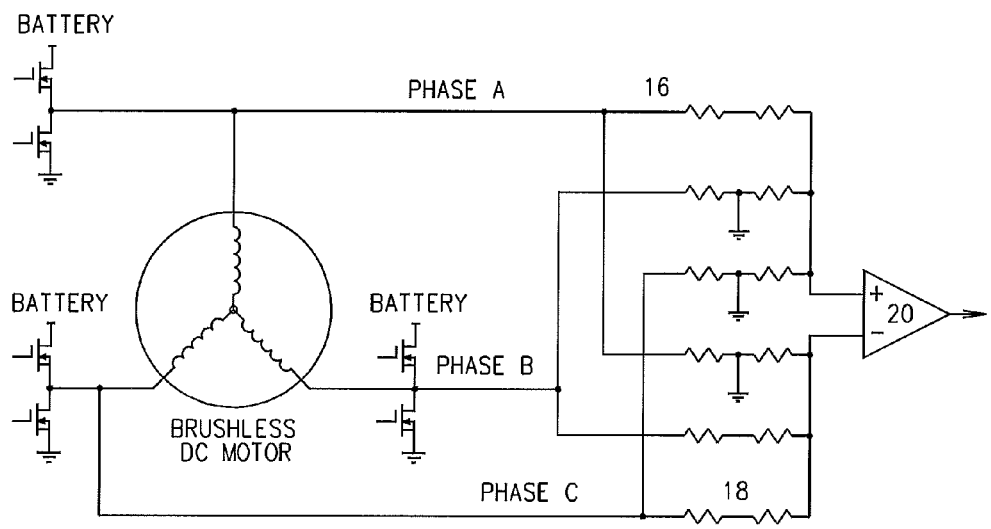
FIG. 8 is a schematic circuit diagram of the present invention.

Consider we want to measure the BEMF of Phase-A. Two switches are used to shunt Phase-B and Phase-C signals out of the summation at the comparator positive input. Simultaneously, one switch is used to shunt out Phase-A signal from the negative input, allowing the divided sum of Phase-B and Phase-C. In all cases, the series resistances are scaled such that they form the correct divider ratios when used as shunts. Three switches are active at any one time. This topology is better illustrated as shown in the accompanying FIGS. 8, 9 and 10.

Figure 9:
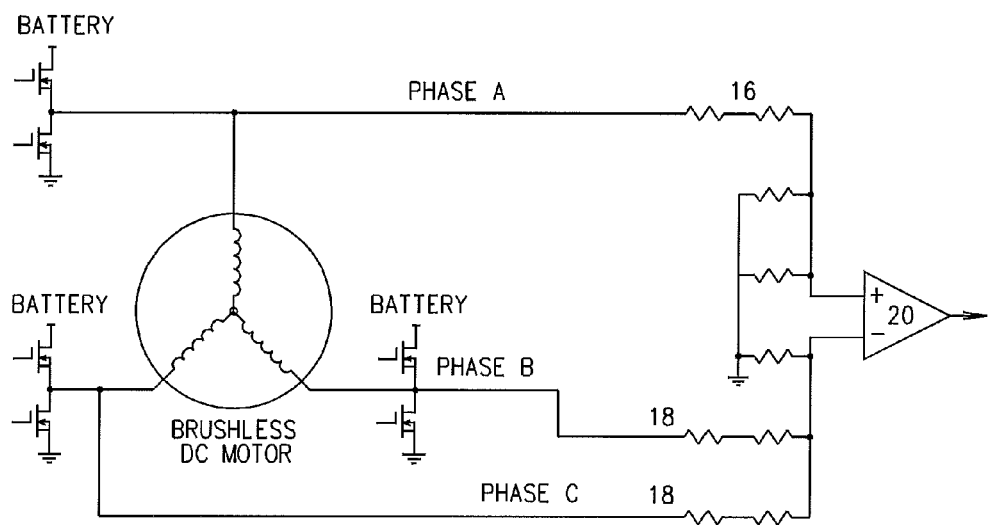
FIG. 9 is a schematic circuit diagram of the present invention.
Figure 10:
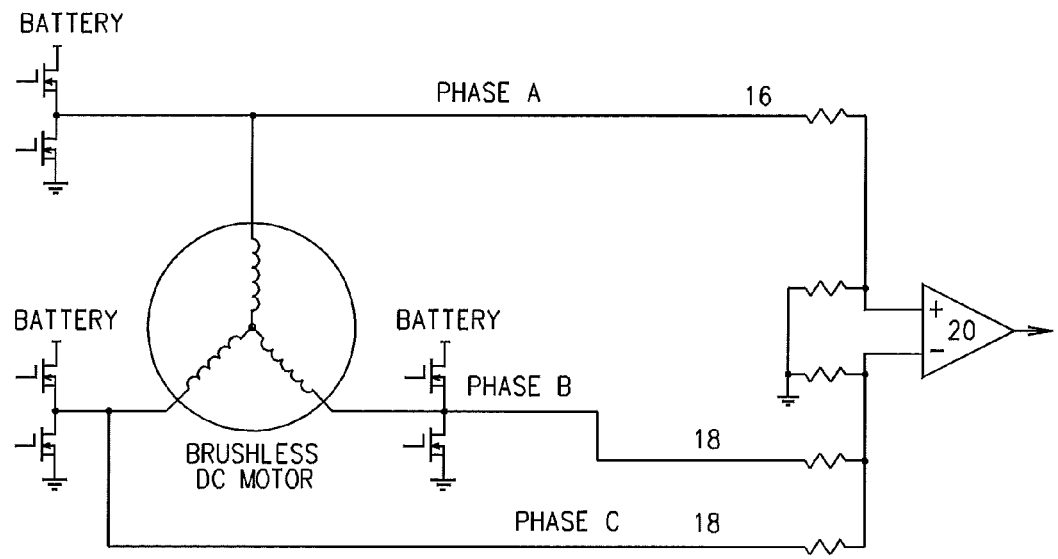
FIG. 10 is a schematic circuit diagram of the present invention.

The switch arrangement can be further reduced as shown in FIG. 9, to arrive at the final equivalent circuit of FIG. 10.

Figure 11:
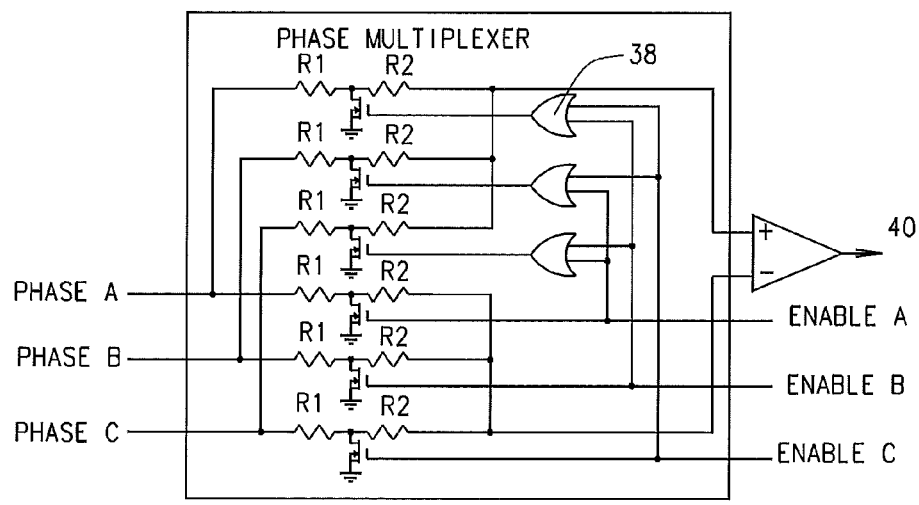
FIG. 11. Is a schematic circuit diagram of the present invention.

It can be similarly shown that the other two phases are selected by reconfiguring the switches. The control signals consist of the logical OR 38 of the three active high control signals as shown in FIG. 11.

The phase multiplexer active elements (switches) may be bipolar or field effect transistors, or may be integrated inside a microcontroller, such as the case with open-drains. When internal to the microcontroller, the selection logic elements reside in the software.

Figure 12:
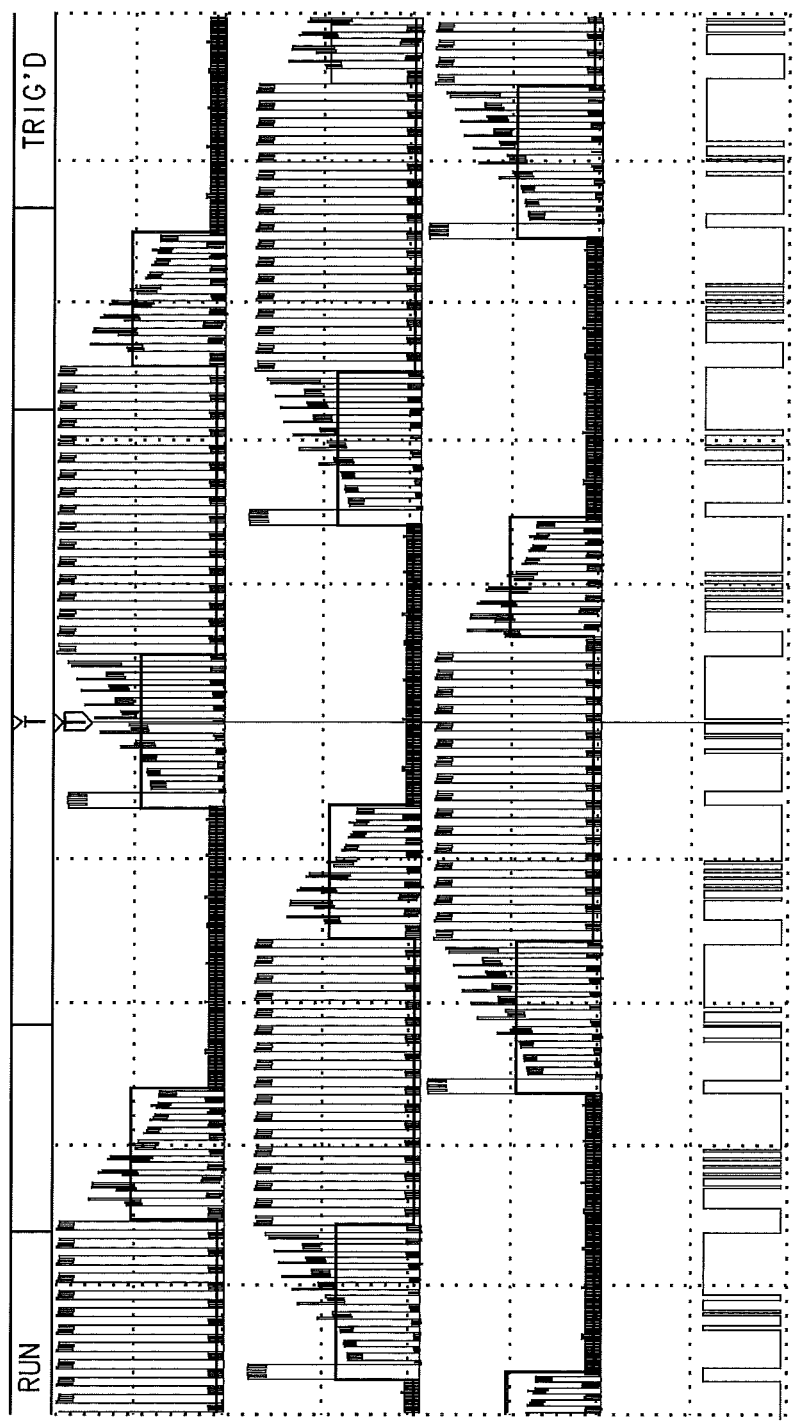
FIG. 12 depicts signals as processed by the present invention.

The multiplexer selects which phase signal will be fed to the comparator under microprocessor control. Hence the comparator output consists of sequential pulse trains from all three phases. This allows one filter to operate on all three phase signals, a benefit in terms of hardware costs, and reduction in overall tolerance error. The filter shall be calibrated as described later in the disclosure. FIG. 12 depicts the signals to be processed by the invention.

In the above figure, we have the typical trapezoidal BEMF waveforms. The three enable signals are superimposed on the respective phases. The waveform G is the output of the single comparator, consisting of sequential segments from the three phases during the respective floating time periods. The sequence repeats as follows: A-rising>C-falling>B-rising>A-falling>C-rising>B-falling>A-rising . . .

The function of the invention is readily apparent; the zero crossing information is buried in false zero crossings caused by inductive ringing.

Figure 13:
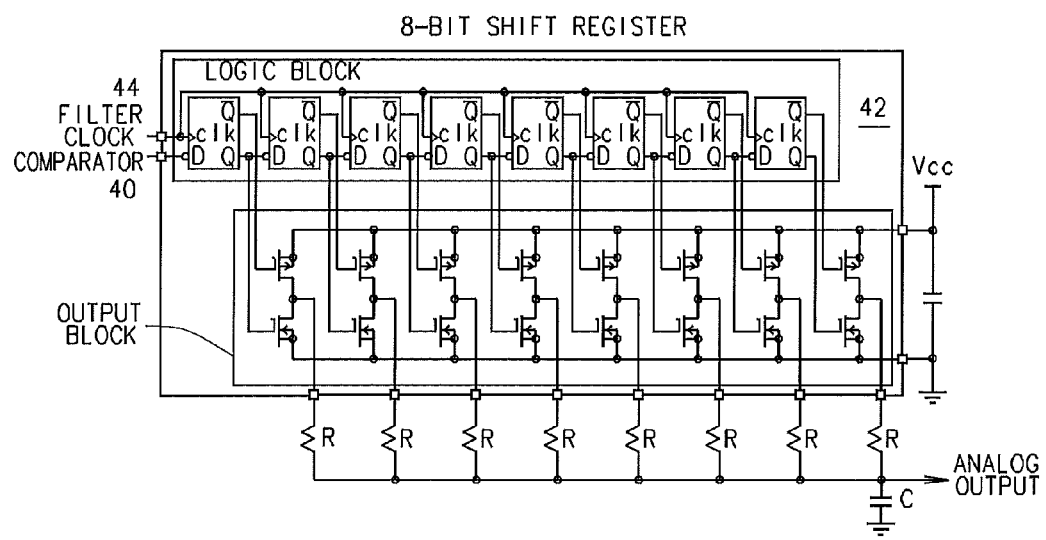
FIG. 13 is a schematic circuit diagram of the present invention.

The above comparator waveform has the property in that the zero crossing occurs at the point where the pulse density is 50%. A filter that finds the position of 50% density in the pulse train is advantageous. In one embodiment, the filter may be constructed digitally, and be adjustable via software, as shown in FIG. 13.

The comparator output 40 is fed into the serial input of a shift register 42. The filter clock 44 is derived from the same time-base as the motor PWM and commutation. This is a requirement in order to avoid precessional noise (beat notes) from dissimilar time-bases. The shift register given in the figure is the most basic type of logic, in essence all extraneous functions, such as clear, preload, output latch structures, and tri-state buffers have been omitted for clarity. Any shift register is within the scope of the invention. The depicted embodiment shown uses a shift register which has push-pull outputs.

The serial signal is fed through the shift register with every clock pulse. The shift register contents represent an 8-bit window of the input bit-stream, the width of the window determined by the clock rate. At any one time, all of the outputs are driven high or low, depending on the digital input.

All of the external resistors 46 are of equal value. At any one time, all of the resistors are connected in parallel for the case of AC signals. The value of C can be chosen to place an analog filter pole at 1/8RC in this example. However C may be omitted. The propagation delay for the filter may be a function of the input clock frequency; hence it is digital and predictable. A minimal value for C is such that glitches from the output propagation are removed, and the analog delay can hence be neglected.

When half of the bits in the window are zero, the other half of the bits shall be one, and the output voltage shall be approximately ½ Vcc. When the majority of the bits are of a common state, the output may assume that state. This fulfills the needs of the zero crossing filter.

This majority function may be implemented by the addition of an output comparator 50 as shown in FIG. 14. For the eight bit example shown, the output shall be one when 5 bits in the captured window are one. Similarly, the output shall be zero when 5 bits in the captured window are zero. Consider a square wave input signal clocked through such a filter as in FIG. 15.

As the square wave signal propagates through the shift register, the rising and falling edges are transformed into rising and falling ramps. The ramp has nine equally spaced levels spanning the range from zero to Vcc. Note this is the ideal case. The propagation delay of the filter is the time required for the majority of the states to be the same, and is equal to (n/2+1) bits for an n-bit shift register.

The circuit was designed as part of a complete BLDC motor model. A model generates the input signal to the comparator as generated by the analog multiplexer. In this module variables which are dependent such as PWM duty cycle, battery voltage and RPM can be decoupled. The signals in the following examples were adjusted such that the model reproduced waveforms are seen on actual hardware with a high degree of accuracy.

Figure 16:
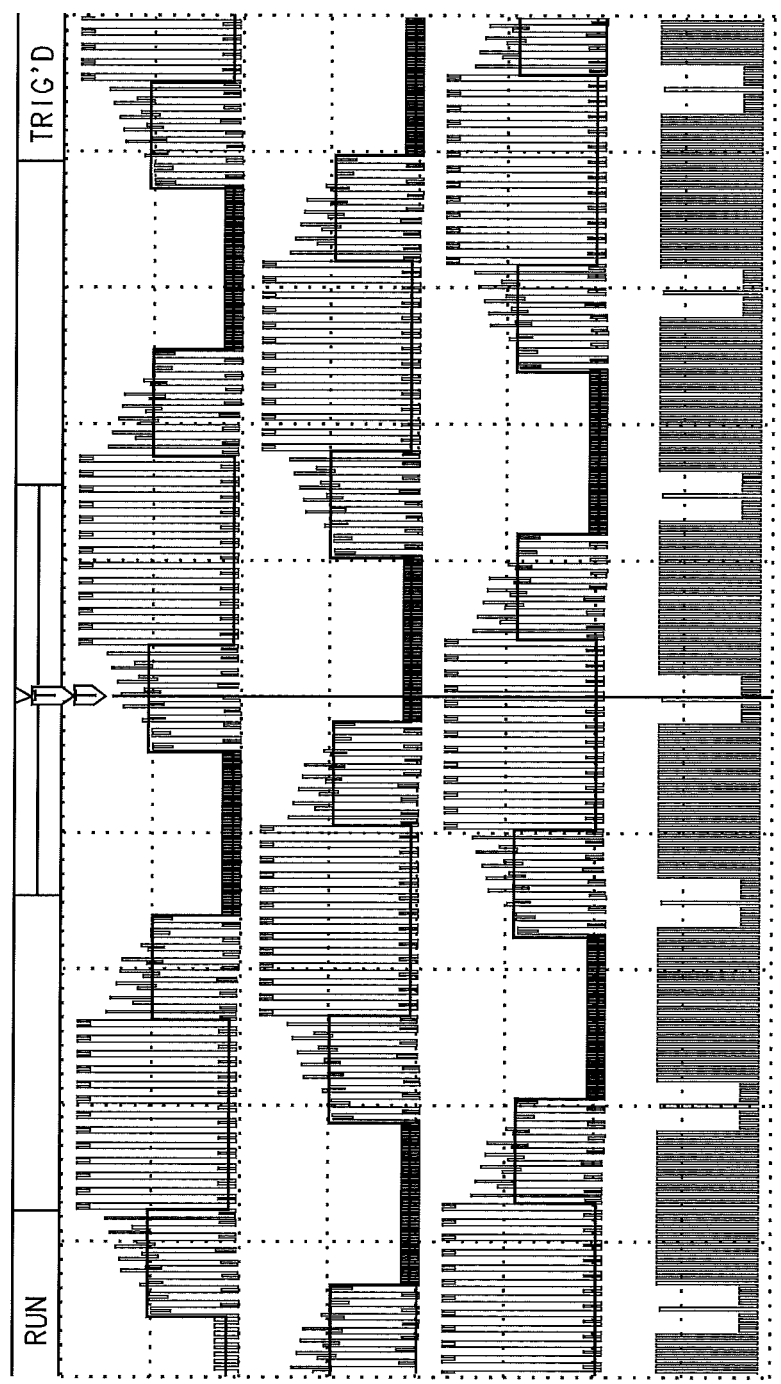
FIG. 16 depicts signals as processed by the present invention.

FIG. 16 depicts the comparator output pulse train.

Figure 17:
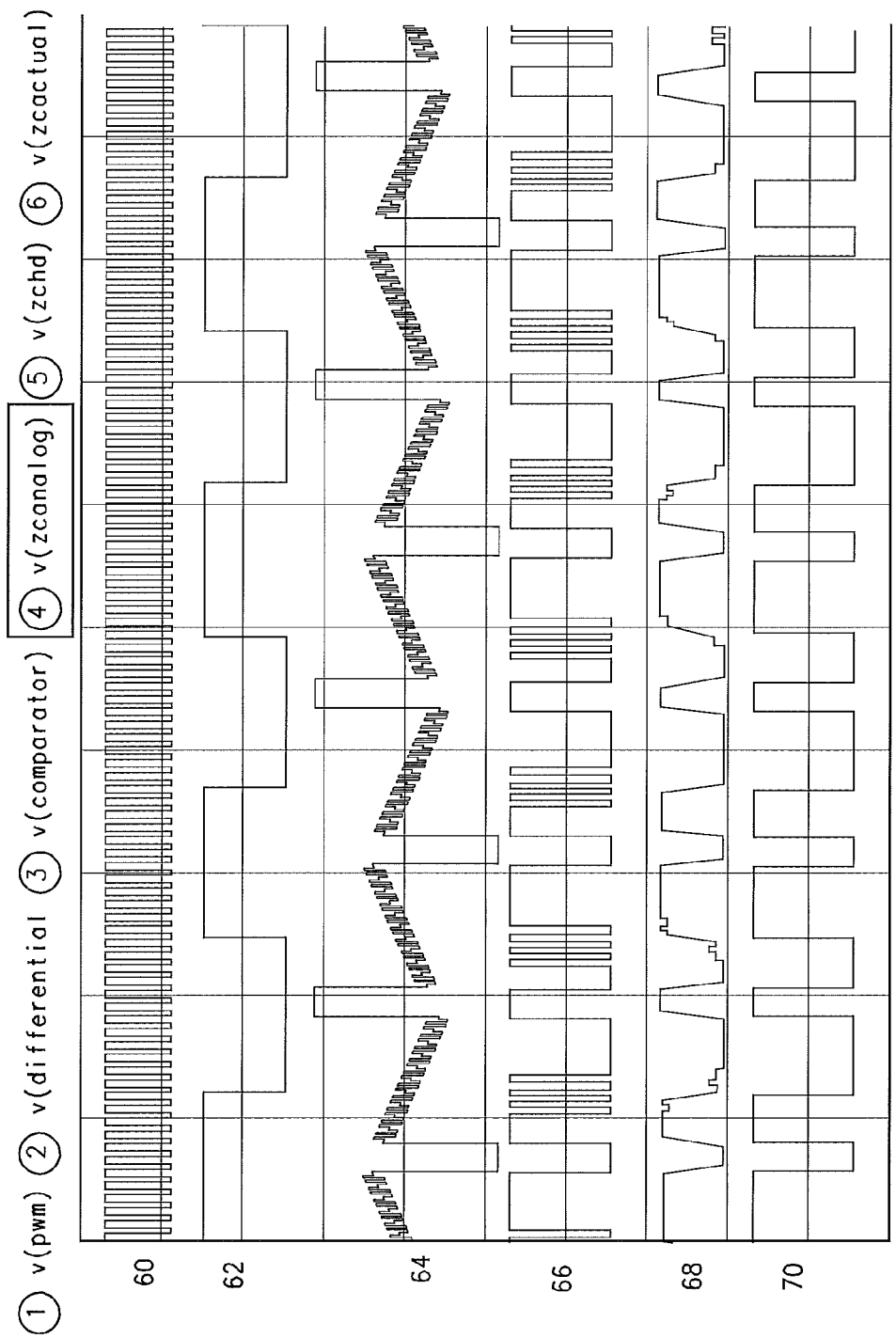
FIG. 17 depicts signals as processed by the present invention.

FIG. 17 shows the model signals for PWM duty cycle of 70%, 4000 RPM and battery voltage of 12V. The legend is as follows: PWM duty cycle, 60; Actual zero crossing prior to noise introduction 62; Comparator input signal 64; Comparator output signal (input to zero crossing filter) 66; Shift register analog summation (secondary comparator input) 68; Output of zero cross filter (secondary comparator output) 70.

Figure 18:
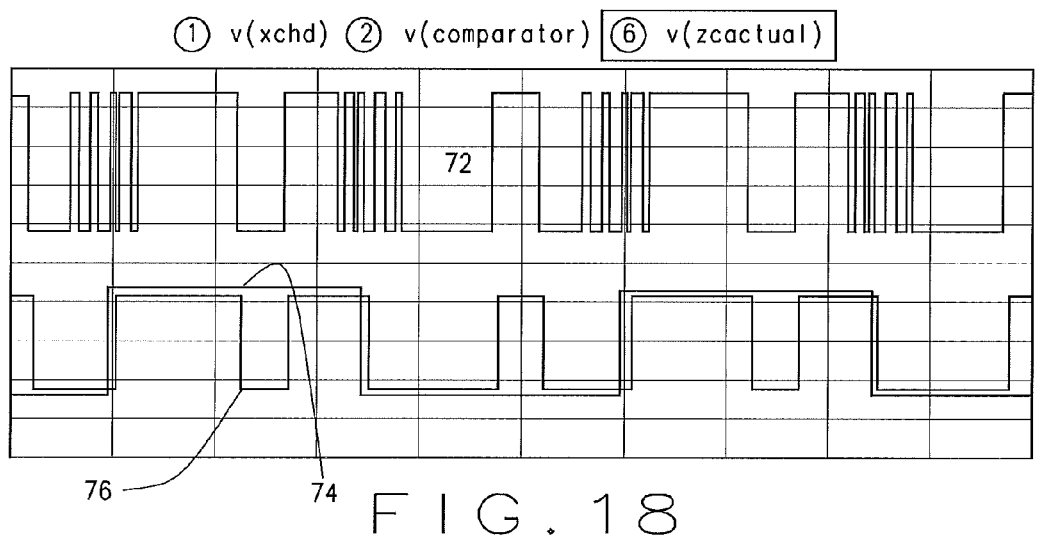
FIG. 18 depicts signals as processed by the present invention.

The comparator pulse train is very similar to the actual hardware, not the alignment of the zero crossing filter output relative to the actual crossing as shown in FIGS. 17 and 18. FIG. 18 shows the actual signal 72; comparator signal 74 and filtered output 76.

Figure 19:
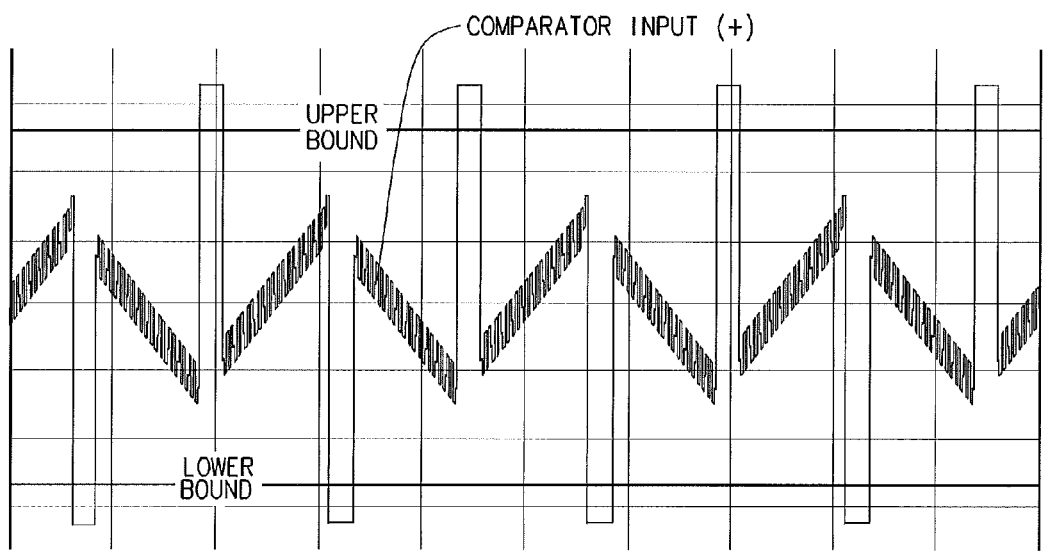
FIG. 19 depicts signals as processed by the present invention.
Figure 20:
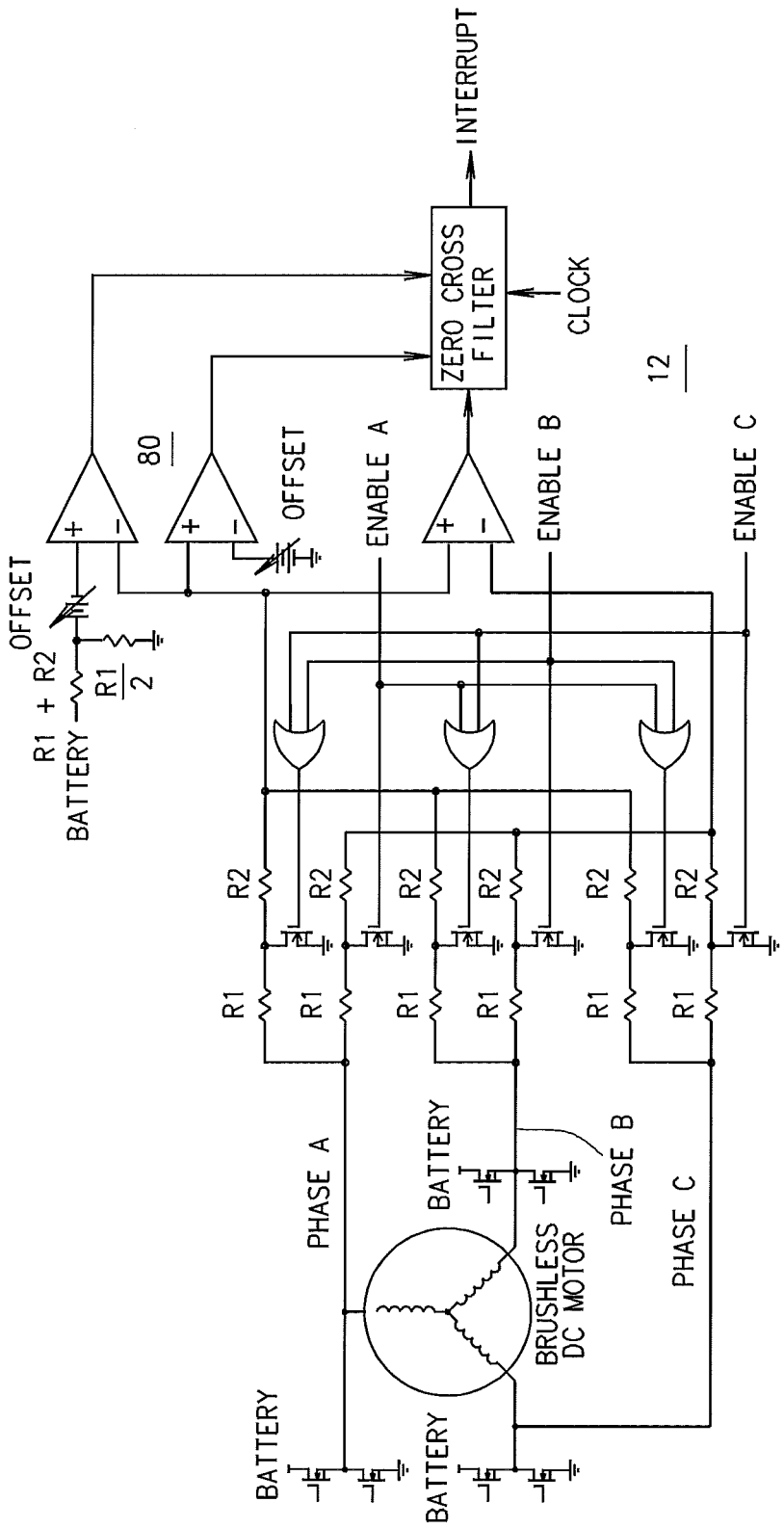
FIG. 20 is a schematic circuit diagram of the present invention.

One will notice the demagnetization pulses which occur in between zero crossings. These are an unavoidable consequence of trapezoidal (block) commutation, occurring every time the current is routed across phase windings. These pulses appear as false zero crossings and must be masked out. Several common methods can be used to mask out the demagnetization pulses. The one shown below is particularly well suited to the comparator method in that a quad comparator solution yields two extra comparators. The demagnetization pulses occur with amplitude either above battery, or below ground by a clamping diode voltage respectively. The additional comparators can be used to exclude state changes in the filter output unless the primary comparator input voltage lies within the amplitudes as shown in FIG. 19.

The upper bound advantageously tracks the battery voltage. Hence the same division ratio as that of the analog multiplexer may be used. Both upper and lower bounds may have adjustable offsets. The minimum offset may be equal to one diode forward voltage (also modified by the multiplexer division ratio).

Figure 22:
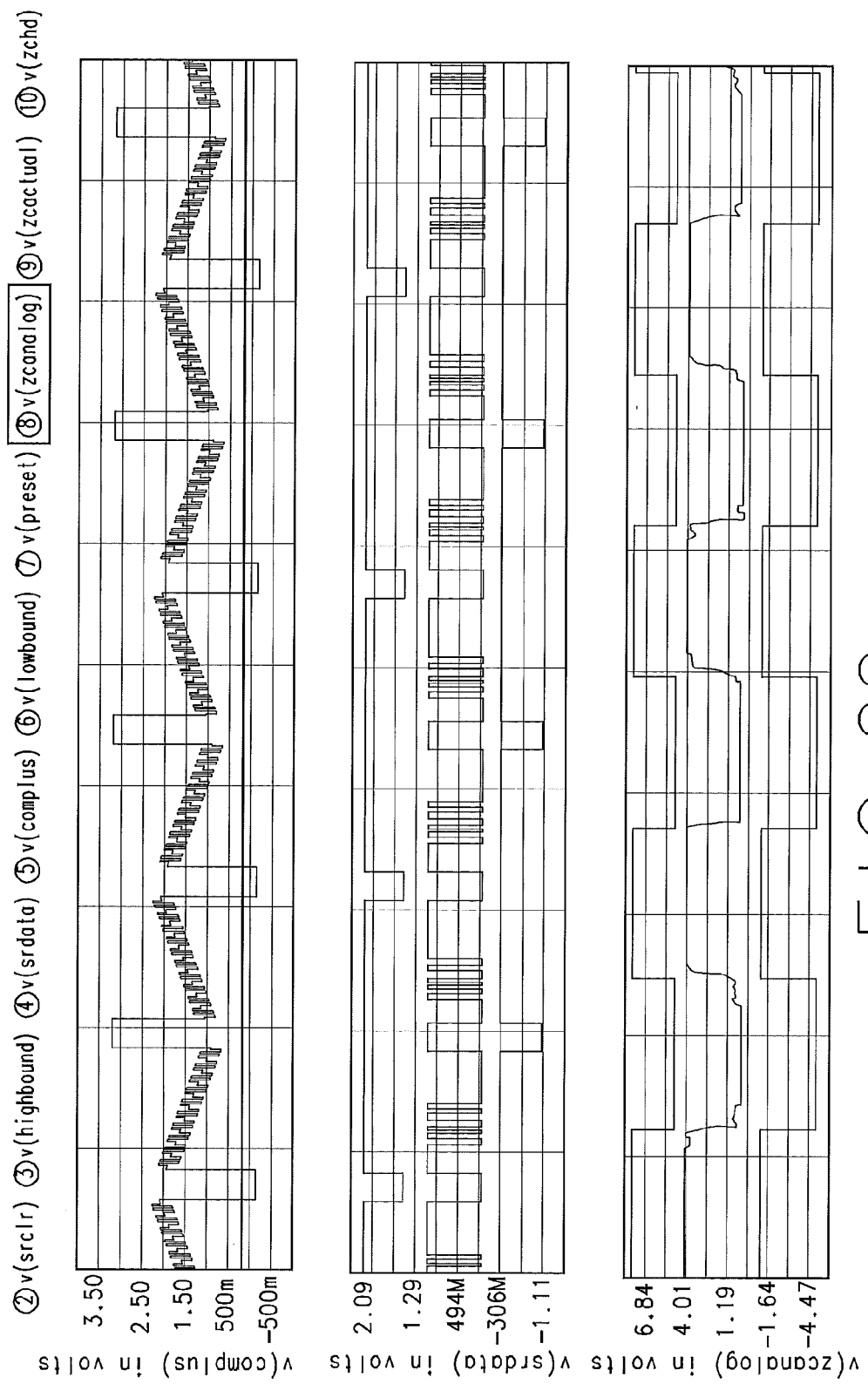
FIG. 22 depicts signals as processed by the present invention.

Analog bounds may be used to remove demagnetization and one embodiment of the present invention implements the bounding comparators 80 to gate the shift register clock or data path to maintain the current state through demagnetizations, resulting in a clean zero crossing pulse train as shown in FIG. 22.

Figure 21:
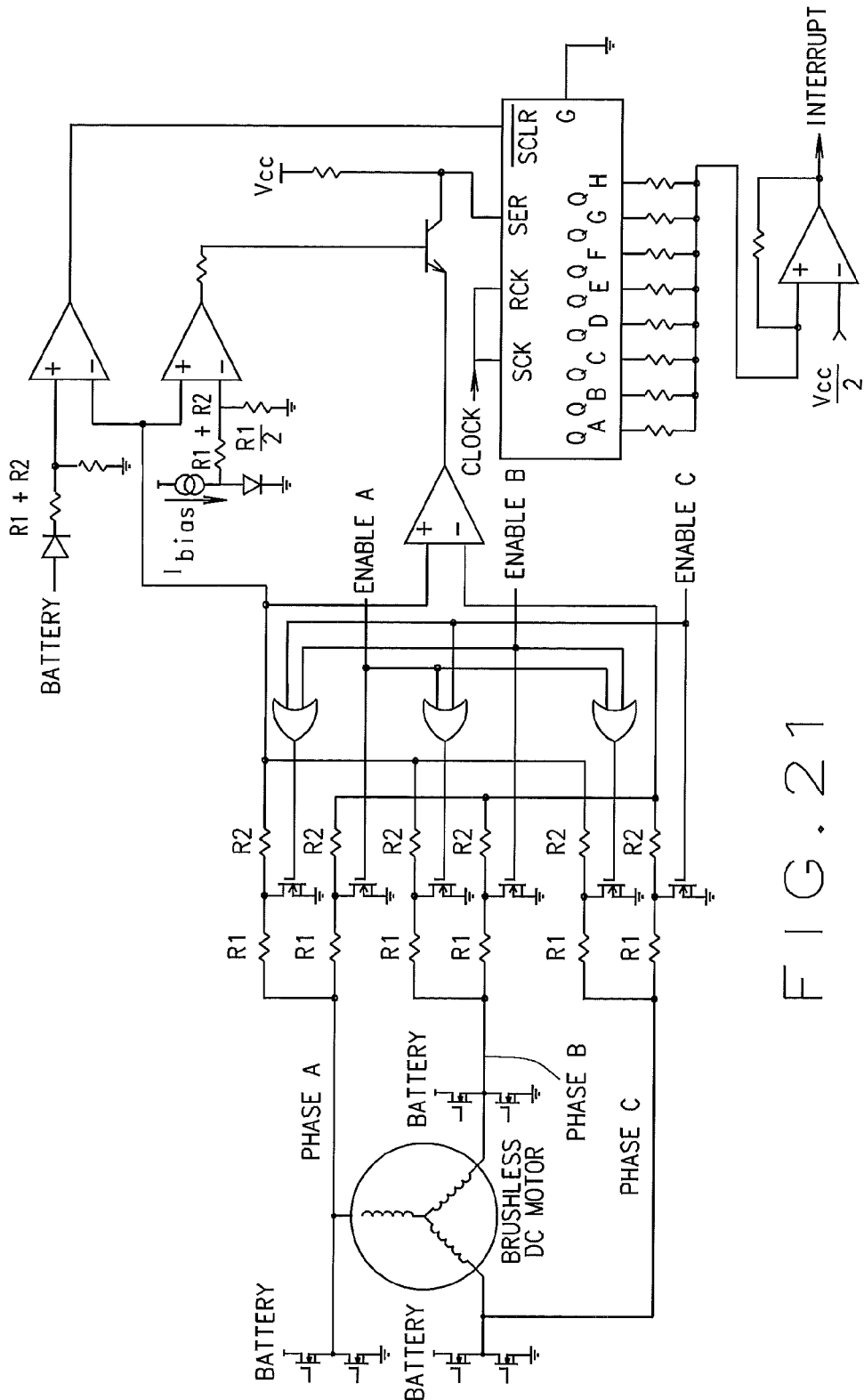
FIG. 21 is a schematic circuit diagram of the present invention.

An example implementation makes use of a shift register with preset function and gating of the data input such that for negative demagnetization pulses, the shift register input shall be a one. Similarly, for positive demagnetization pulses the output shall be zero. The interrupt comparator 82 should include hysteresis to further improve noise immunity. FIG. 21 represents the invention suitable for development into an ASIC.

FIG. 22 shows the zero cross signal used to generate the waveforms (top), the analog intermediate signal (middle), and the final output of the zero cross filter (bottom). The implementation may be split into hybrids of discrete hardware and software.

One such implementation would involve the use of a discrete comparator fed via the analog multiplexer with the comparator output 40 fed into the data input pin of a SPI peripheral. The SPI (Serial Peripheral Interface) port is based on a shift register inside the microcontroller. The Majority-Function must be carried out internal to the microcontroller in this embodiment.

The SPI is read normally. The word length may of be important. The resulting hex data is cross referenced via to a look-up table 94, the size of which is determined by the word length used, allowing an extra bit for hysteresis. The extra bit is the present state of the zero cross. As an example for 8-bit data, if the zero cross is presently zero, then the majority of the SPI read data shall not be five, but six. Similarly, if the present state is one, the inverse majority is not three zeros, but two.

Figure 23:
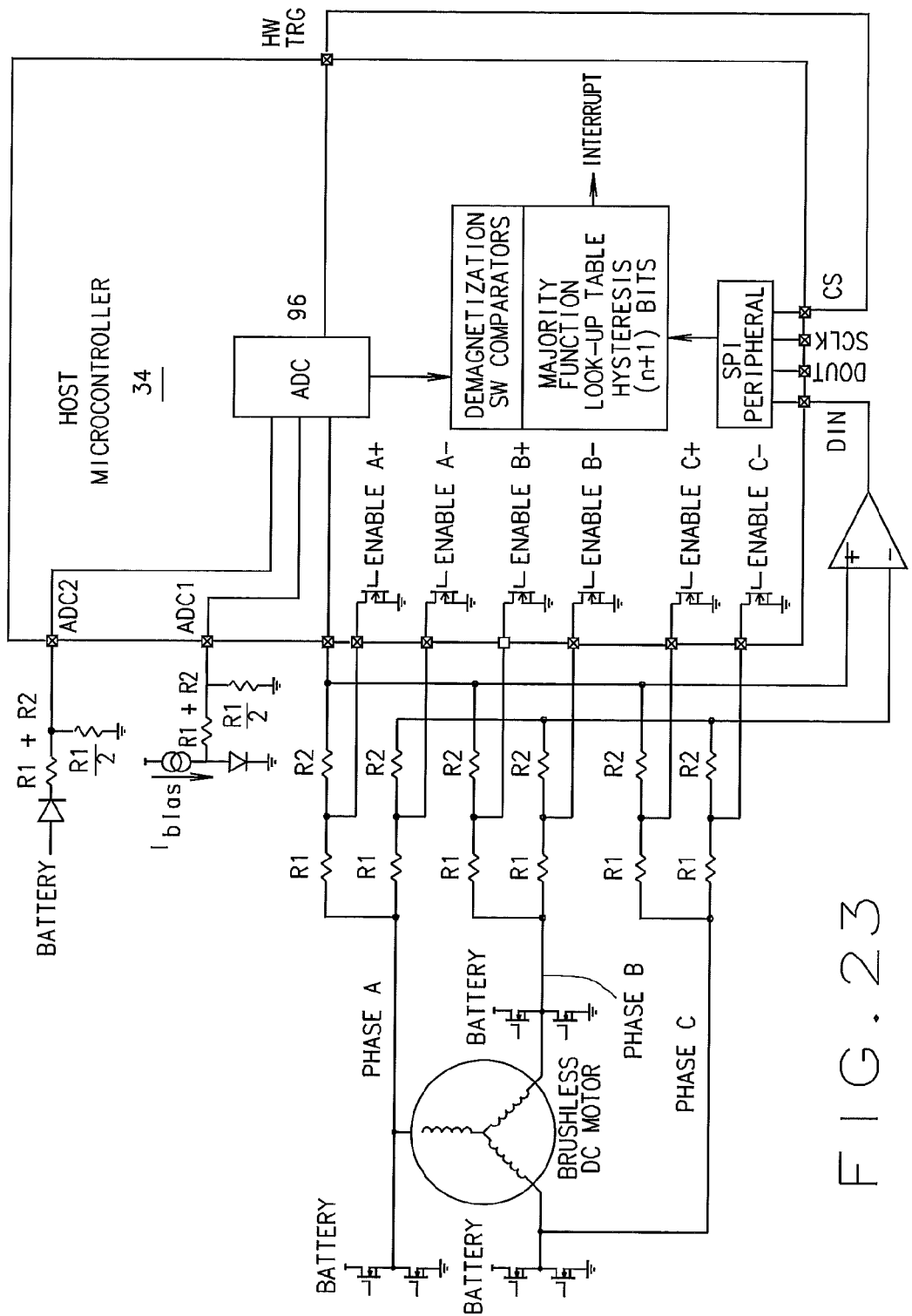
FIG. 23 is a schematic circuit diagram of the present invention.

The chip select for SPI reads can be connected to the ADC trigger 96, initiating a conversion of three channels, such as depicted in FIG. 23. The channels are the high limit, low limit, and the non-inverting comparator signal. The equivalent function of the demagnetization comparators 98 is then done in software, and the resulting commutation software interrupt is masked based on the comparison result. When combined with six open-drain I/O for the analog multiplexer, the embodiment is reduced to a single external hardware comparator.

This invention provides advantages in the timing accuracy of detection of the zero crossing events. In order to realize the increase in accuracy, interrupt based microcontroller architecture may be used, in preference to Polling architectures. The group delay introduced into the zero cross detection can be reliably cancelled out of the commutation calculation because the width of the sample (in bits) is known, and the majority occurs at n/2+1 for n-bits. For example, the filter delay for an 8-bit shift register clocked at 1 MHz will be a fixed 5 microseconds. For a 16 bit register at the same frequency it will be 9 microseconds. Typical flip-flop based comparator filters can introduce a worst case delay of one PWM period. At 10 kHz PWM, this is 100 micro seconds of commutation delay.

The invention provides improvement over analog filtering methods. Analog methods are not easily tunable to the PWM frequency, and add delay which varies with tolerance and temperature.

The invention may be embodied in various hybrid approaches moving some of the functions into the hardware of a microcontroller, making an inexpensive robust solution to the zero crossing detection problems.

The disclosed methods may be embodied on an ASIC with an integrated micro-core, providing a stand-alone solution for brushless motor drive.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

We claim:

1. In a multi-phase brushless DC motor, a zero crossing N-bit filter comprising:

a comparator;

a phase multiplexer;

said phase multiplexer connecting each motor phase to each of a positive and a negative input of said comparator, with a switch in each connection;

a microprocessor disposed to operate said switches, said microprocessor being configured to measure a BEMF for a first phase by opening said switches connecting all other phases to said positive input of said comparator and by opening said switch connecting said first phase being measured to said negative input of said comparator;

a shift register in operative communication with an output of said comparator;

an extra bit, said extra bit being a hysteresis bit;

wherein said extra bit has a present state that is the present state of a zero cross.

2. The filter in claim 1 wherein said motor is a three phase motor.

3. The filter in claim 1 wherein said comparator is a single comparator.

4. The filter in claim 1 wherein said phase multiplexer is a switch array.

5. The filter of claim 1 comprising at least one resistor in each of said connections.

6. The filter of claim 5 further comprising said resistors being deployed in said connections such that the resistance in each connection is equal.

7. The filter in claim 1 further comprising at least one additional comparator, said comparators totaling in number at least one fewer than the total number of motor phases.

8. The filter in claim 1 wherein filtering is executed in the digital domain using look-up tables.

9. The filter of claim 1 wherein a filter clock signal is received by said shift resistor from the same source as the motor PWM clock.

10. The filter of claim 9 further comprising an interrupt comparator disposed to reduce noise.

11. The filter of claim 1 wherein the output of said shift register is the same state as a majority of the bits within said shift register, thereby executing a majority function.

12. The filter of claim 11 wherein said majority function is implemented by an output comparator.

13. The filter of claim 1 wherein analog bounds remove demagnetization.

14. The filter of claim 1 further comprising bounding comparators disposed to gate one of a shift register clock or a data path so as to maintain the current state through demagnetizations such that a clean zero crossing pulse train is output.

15. The filter of claim 1 wherein said shift register is a serial peripheral interface.

16. The filter of claim 1 further comprising an ADC trigger, said ADC trigger being disposed to initiate conversion of at least one channel.

17. The filter of claim 1 wherein said microprocessor is configured on an interrupt basis.

18. The filter of claim 1 wherein said filter configured using at least one of a SPI port or a high speed UART.

19. In a multi-phase brushless DC motor, a zero crossing N-bit filter comprising:

a comparator;

a phase multiplexer;

said phase multiplexer connecting each motor phase to each of a positive and a negative input of said comparator, with a switch in each connection;

a microprocessor disposed to operate said switches, said microprocessor being configured to measure a BEMF for a first phase by opening said switches connecting all other phases to said positive input of said comparator and by opening said switch connecting said first phase being measured to said negative input of said comparator;

said comparator outputting a signal that is received by a shift register; and said microprocessor being further configured to respond to a zero crossing when a majority of bits in said shift register change between high and low;

said shift register in operative communication with an output of said comparator;

an extra bit, said extra bit being a hysteresis bit;

wherein said extra bit has a present state that is the present state of a zero cross.

* * * * *